United States Patent [19]

Kurita et al.

[11] Patent Number: 5,675,248
[45] Date of Patent: Oct. 7, 1997

[54] MAGNETIC SENSOR WITH MOLDED CASING HAVING AN INSERT MOLDED COIL ASSEMBLY, POLE PIECE AND MAGNET AND AMOUNTING BRACKET ASSEMBLY

[75] Inventors: Tsutomu Kurita; Kazuo Yuhi, both of Miyazaki-ken, Japan

[73] Assignee: Kabushi Kaisha Honda Lock, Miyazaki-Zen, Japan

[21] Appl. No.: 309,293

[22] Filed: Sep. 20, 1994

[30] Foreign Application Priority Data

| Dec. 15, 1993 | [JP] | Japan | 5-343592 |
| Dec. 15, 1993 | [JP] | Japan | 5-343594 |
| Dec. 15, 1993 | [JP] | Japan | 5-343595 |
| Dec. 15, 1993 | [JP] | Japan | 5-343596 |

[51] Int. Cl.[6] .............. G01B 7/14; G01D 21/00; G01P 3/488; H01F 41/06
[52] U.S. Cl. .............. 324/174; 324/207.15; 339/92; 29/602
[58] Field of Search .............. 324/173, 174, 324/207.15, 207.25; 29/605; 336/90, 92, 96, 110

[56] References Cited

U.S. PATENT DOCUMENTS

| 5,278,496 | 1/1994 | Dickmeyer et al. | 324/174 |
| 5,363,033 | 11/1994 | Suda et al. | 324/207.25 |
| 5,418,454 | 5/1995 | Togo | 324/174 |

FOREIGN PATENT DOCUMENTS 63-285414  11/1988  Japan.

*Primary Examiner*—Walter E. Snow
*Attorney, Agent, or Firm*—Skjerven, Morrill, MacPherson, Franklin & Friel LLP; Alan H. MacPherson; Thomas S. MacDonald

[57] ABSTRACT

Various component parts of a sensor main body are integrally insert molded, and are mounted to a mounting bracket member which is adapted to be securely attached to an external member such as a vehicle body. The sensor mount member defines a recess closely receiving an end of the molded casing, and these two parts are securely joined together by ultrasonic welding. Simultaneously, necessary electric connections are effected when the sensor main body is fitted into this recess via pin and socket connectors. Thus, both the reliability and the mechanical strength of the magnetic sensor can be ensured without involving the use potting material and the process of making electric connections which are known to complicate the fabrication process.

7 Claims, 3 Drawing Sheets

5,675,248

MAGNETIC SENSOR WITH MOLDED CASING HAVING AN INSERT MOLDED COIL ASSEMBLY, POLE PIECE AND MAGNET AND AMOUNTING BRACKET ASSEMBLY

TECHNICAL FIELD

The present invention relates to a magnetic sensor comprising a pole piece, a coil wound around the pole piece, and a permanent magnet piece attached to an end of the pole piece, and in particular to a magnetic sensor suitable for detecting the rotational speed of an engine, a wheel or the like.

BACKGROUND OF THE INVENTION

Electronic magnetic sensors are widely used for detecting the rotational speed of automotive engines and road wheels. A coil is wound around a permanent magnet piece, and when a magnetic material such as a projection of a steel member and a gear wheel made of steel passes near the permanent magnet piece, some change occurs to the magnetic flux. Such a change in the magnetic flux produces a corresponding electric current in the coil.

Typically, such a magnetic sensor is integrally fabricated by placing the essential components such as a permanent magnet piece, a coil, a bobbin and a pole piece in a casing, securing the casing to a mounting stay, and filling potting material consisting of epoxy resin or other synthetic resin material into the casing as well as gaps and recesses effective in bonding the mounting stay and the casing together. For details of such a conventional structure, reference should be made to Japanese patent laid open (kokai) publication No. 63-285414.

According to this conventional structure, a considerable amount of work is necessary for placing all the essential components in the casing. Furthermore, lead wires must be connected to coil terminals either before the coil is placed in the casing or after the coil is placed in the casing, and, either case, this also involves a substantial amount of work. For these reasons, there has been a considerable difficulty in reducing the fabrication cost.

A magnetic sensor is often placed in a harsh environment. When the rotational speed of a road wheel is to be detected, for instance, the magnetic sensor must be mounted on a part of a wheel carrier which is constantly exposed to water, dust, mud and other undesirable foreign matters. According to the prior art, potting material is often filled into the casing to fixedly secure the various components received therein and to seal off foreign matters such as moisture from these components, but, during the fabrication process, a considerable time period is required for such potting material to be fully cured, and it creates a serious problem when a mass production is contemplated. Also, special equipment is necessary for filling the potting material in a highly viscous liquid form into the casing.

In such a magnetic sensor, the gap between the pole piece and the magnetic material which passes near the pole piece is critical for the performance of the magnetic sensor, and the dimensional accuracy of the magnetic sensor, insofar as it affects the size of the magnetic gap, must be ensured. This also creates the need for special tools and gauges as well as special care in ensuring dimensional accuracy in various stages of the fabrication process.

BRIEF SUMMARY OF THE INVENTION

In view of such problems of the prior art, a primary object of the present invention is to provide a magnetic sensor which is economical and easy to fabricate.

A second object of the present invention is to provide a magnetic sensor which is also reliable in operation by being properly sealed against foreign matters such as moisture.

A third object of the present invention is to provide a magnetic sensor which is mechanically strong and durable.

A fourth object of the present invention is to provide a magnetic sensor which can be easily fabricated so as to be dimensionally accurate, and can ensure satisfactory performance by thus ensuring an accurate magnetic gap.

These and other objects of the present invention can be accomplished by providing a magnetic sensor, comprising; a coil assembly including electroconductive wire wound around a bobbin; a pole piece fitted into a central bore of the coil assembly; a permanent magnet piece attached to an inner end of the pole piece; a molded casing receiving the coil assembly, the pole piece, and the permanent magnet piece integrally insert molded therein; and a mounting bracket assembly including a sensor mount member having the molded casing mounted thereto, and a mounting bracket member integrally connected to the sensor mount member and having means for securely attaching the mounting bracket assembly to an external member. Preferably, the sensor mount member defines a recess closely receiving an end of the molded casing.

Thus, the various components of the sensor main body are integrally insert molded, and are not only sealed from external influences but also mechanically secured so that both the reliability and the mechanical strength of the magnetic sensor can be ensured. Furthermore, by fixedly securing a part of the molded casing received in the recess to an inner wall surface of the recess of the mounting bracket assembly by ultrasonic welding, and thus eliminating any need for potting material, the fabrication process can be simplified, and can be made highly efficient.

According to a preferred embodiment of the present invention, at least one first terminal projects from a part of the molded casing received in the recess, and a second terminal is provided in the recess so that the first and second terminals may be electrically coupled to each other when the molded casing is fitted into the recess of the mounting bracket assembly. Thus, the process of making electric connections can be simplified, and this also contributes to the simplification of the fabrication process.

The magnetic gap between the outer end surface of the pole piece and an magnetic member to be detected is highly crucial for proper performance of the magnetic sensor. According to a preferred embodiment of the present invention, by providing a welding portion in the recess which melts away as the molded casing is pushed into the recess with ultrasonic welding head applied to the molded casing, a distance between an outer end surface of the pole piece and a reference surface of the mounting bracket member may be determined by a stroke of the ultrasonic welding head pushing the molded casing into the recess. Thus, a dimensional accuracy of a critical part of the magnetic sensor can be ensured without any difficulty.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
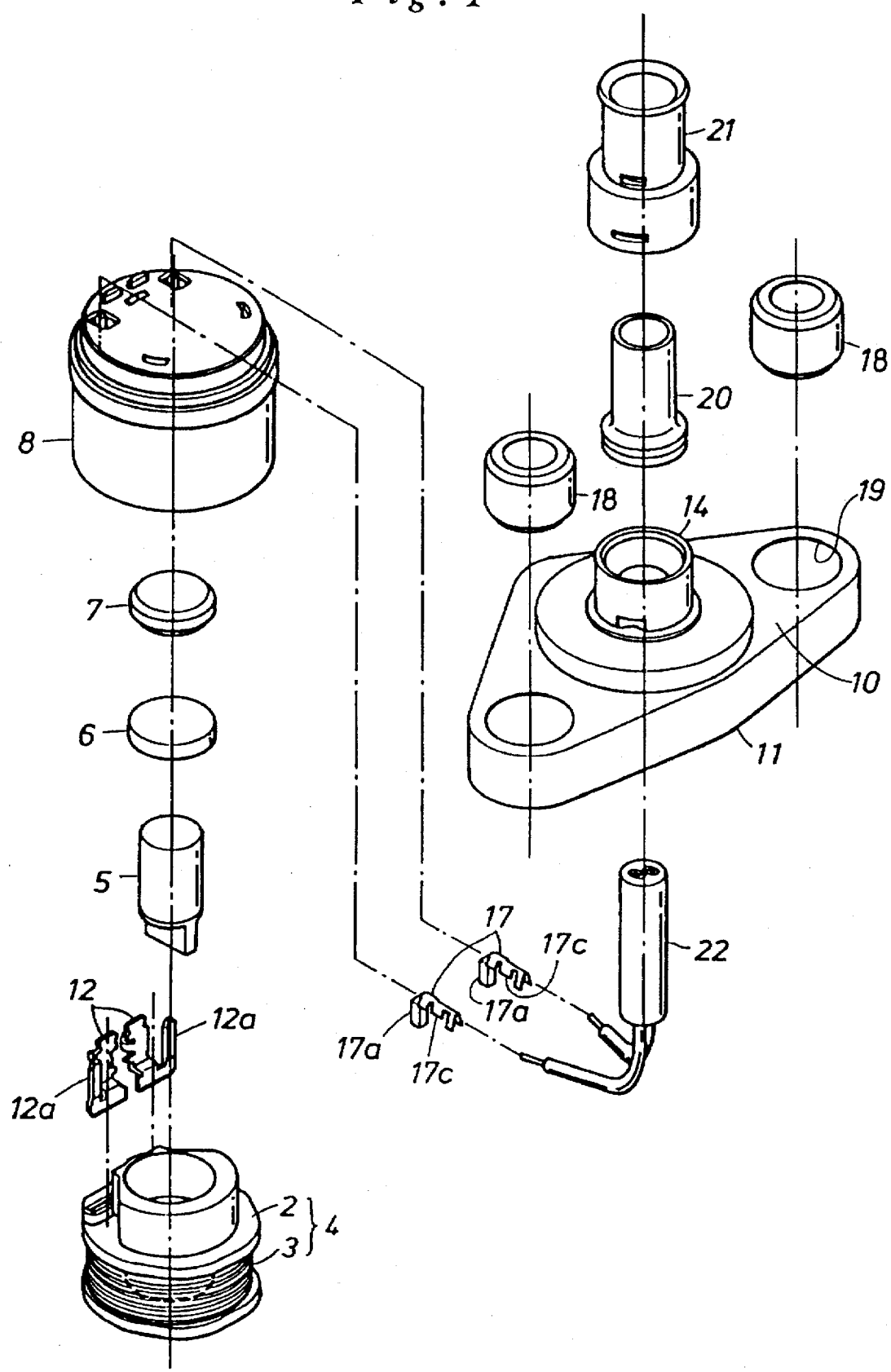
FIG. 1 is an exploded perspective view of a preferred embodiment of the magnetic sensor according to the present invention.
Figure 2:
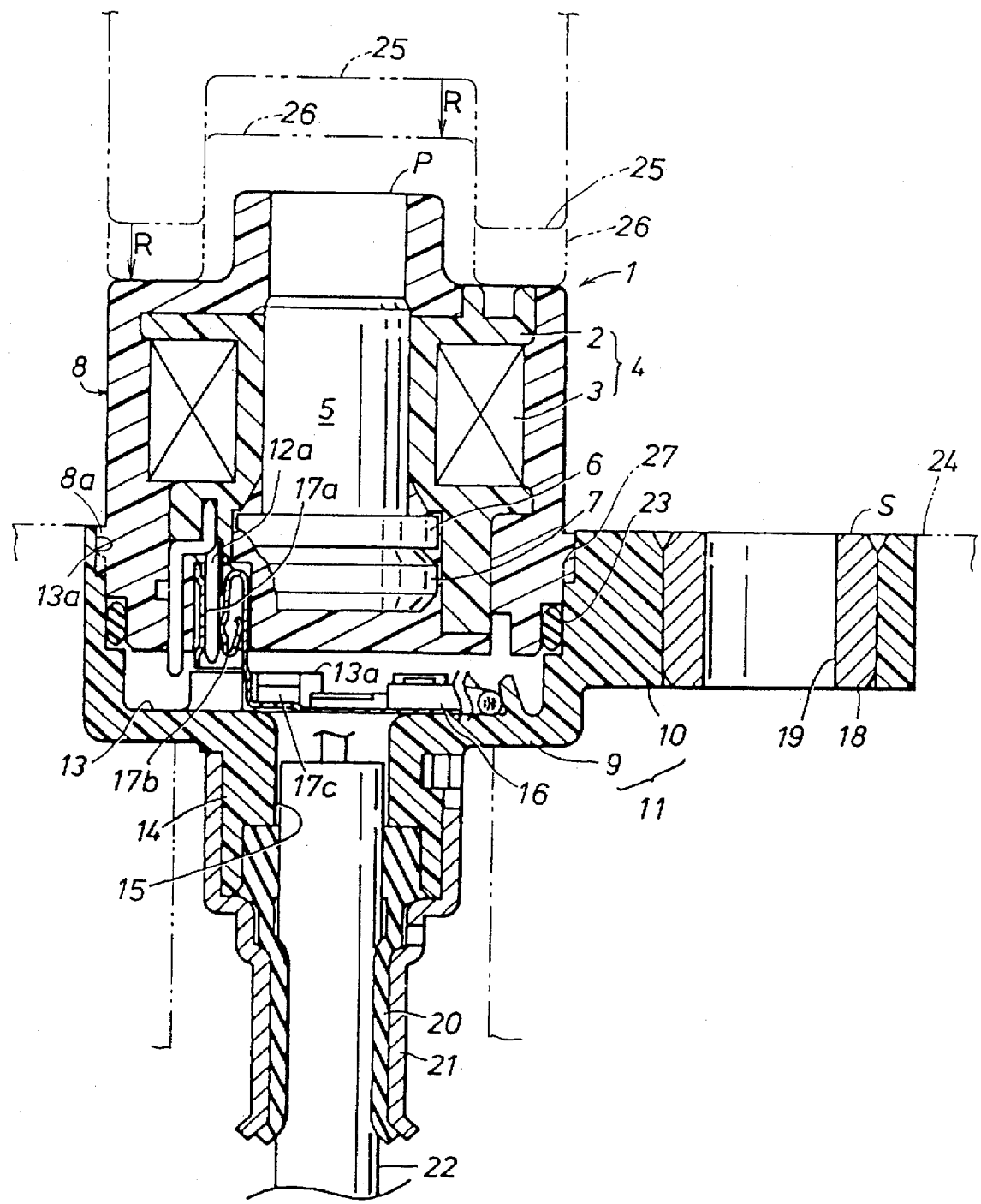
FIG. 2 is a sectional view of the magnetic sensor.
Figure 3:
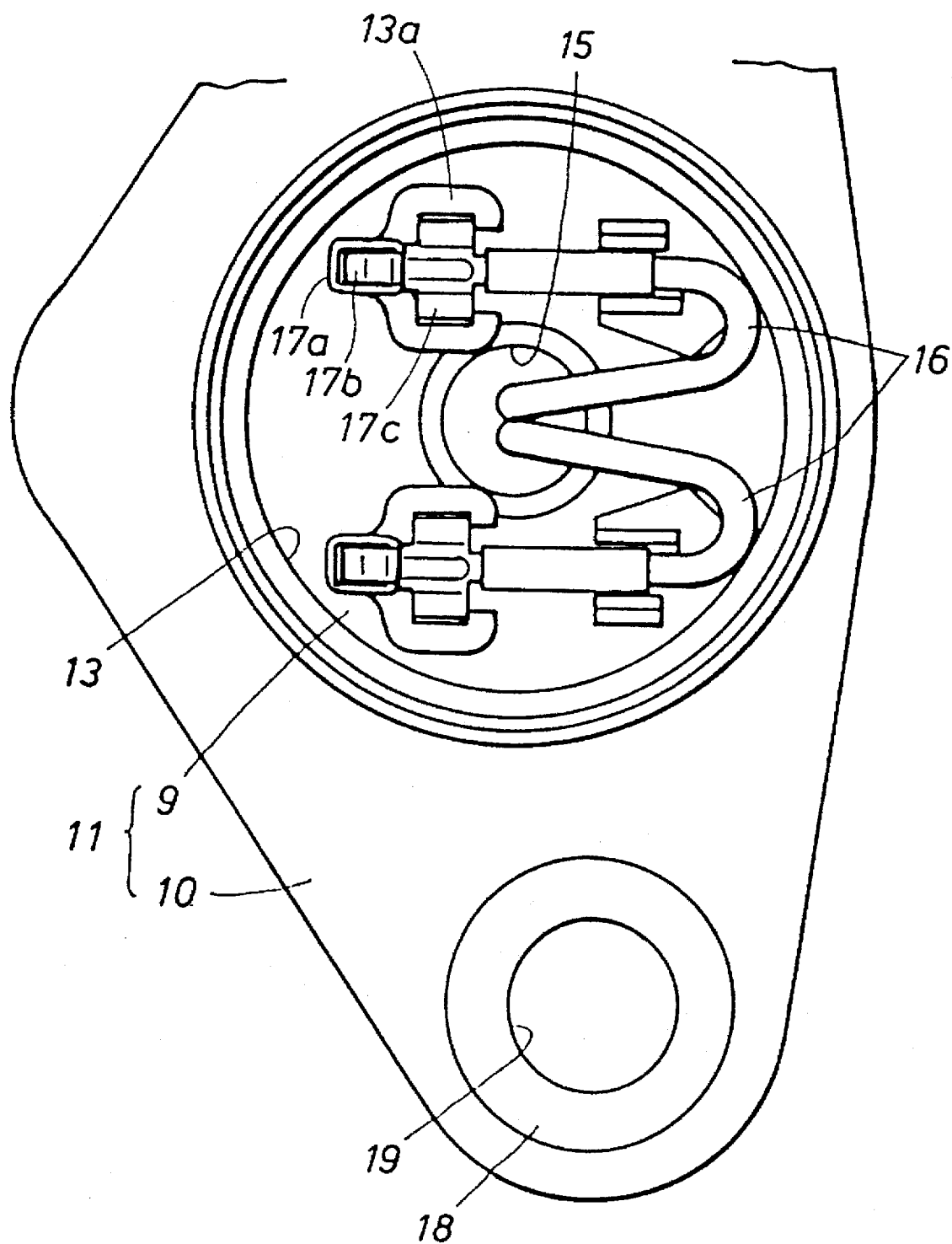
FIG. 3 is a plan view of the stay assembly before it is joined with the main body of the magnetic sensor.

FIG. 1 through 3 show a preferred embodiment of the magnetic sensor according to the present invention. This magnetic sensor 1 consists of a sensor main body 8 and a mounting stay assembly 11. The sensor main body 8 comprises a coil assembly 4 consisting of electroconductive wire 3 wound around a bobbin 2 made of injection molded nylon resin or the like, a cylindrical pole piece 5 fitted in a central bore of the coil assembly 4, a permanent magnet piece 6 attached to an inner end of the pole piece 5, and a yoke 7 secured to the opposite end of the permanent magnet piece 6. The mounting stay assembly 11 comprises a sensor mount member 9 attached to the sensor main body 8, and a mounting bracket 10 for mounting the magnetic sensor 1 on a fixed part of a vehicle body or the like.

Terminal ends of the electroconductive wire 3 wound around the bobbin 2 are connected to a pair of male terminals 12 press fitted into the bobbin 2, respectively, by fusing. Pin plugs 12a projecting from these male terminals 12 are fitted into female terminals 17 which are described hereinafter.

The sensor main body 8 is molded into a columnar shape by placing the above mentioned component parts in a die assembly, and insert molding the entire assembly with nylon resin or the like except for the free end surface of the pole piece 5 and the pin plugs 12a of the male terminals 12. The outer circumferential surface of the sensor main body 8 is provided with an annular projection 8a projecting radially therefrom.

The mounting stay assembly 11 is injection molded with nylon resin or the like, and is provided with a recess 13 at its sensor mount member 9 for closely receiving an end of the sensor main body 8 having the pin plugs 12a projecting therefrom. The recess 13 includes a large-diameter portion 13a at its upper end as seen in FIG. 2 adapted to receive the annular projection 8a of the sensor main body 8. The bottom surface of this recess 13 is provided with a hole 15 which is passed through a central boss 14 formed at the bottom of the sensor mount member 9 as seen in FIG. 2, for passing a pair of wire leads 16 received in a water-proof sheathed cable 22. A pair of female terminals 17 are connected to these wire leads 16, and are fixedly secured to the bottom surface of the recess 13.

Each of the female terminals 17 is made of one piece, and includes a tubular socket 17a, a spring piece 17b extending into the tubular socket 17a, and a leg piece 17c extending from an end of the tubular socket 17a. Thus, when the corresponding pin plug 12a is fitted into the tubular socket 17a, the spring piece 17b is resiliently urged against the pin plug 12a. The leg piece 17c is press fitted into a terminal supporting slot 13a provided in the bottom surface of the recess 13.

The mounting bracket 10 is provided with a pair of mounting holes 19, and a metallic collar 18 is fitted into each of the mounting holes by insert molding. Thus, the force applied by threaded fasteners on the mounting bracket 10 can be favorably supported by these metallic collars 18.

An end of a rubber boot 20 is fitted into the external end of the hole 15, and a metallic sleeve 21 is fitted onto the central boss 14 along with the cable 22 and the rubber boot 20. The metallic sleeve 21 is inwardly crimped against the central boss 14, and is thus integrally secured to the central boss 14. The sleeve 21 is reduced in diameter at a portion thereof surrounding the rubber boot 20, and is crimped against the rubber boot 20 over its entire circumference so that the cable 22 is closely covered by the rubber boot 20, and passed through the central hole 15 in a tightly sealed manner.

When joining the sensor main body 8 and the stay assembly 11 together, the sensor main body 8, with an O-ring 23 fitted on a lower end thereof, is fitted into the recess 13 of the stay assembly 11 while the pin plugs 12a of the male terminals 12 of the sensor main body 8 are fitted into the sockets 17a corresponding female terminals 17 of the mounting stay assembly 11. In this provisionally assembled state, the sensor main body 8 and the mounting stay assembly 11 are placed on an ultrasonic welder, and are welded together over the entire circumference.

Imaginary lines 24 and 25 schematically indicate the positions of the support die for the mounting stay assembly 11 and the welding head applied to the sensor main body 8 before welding, respectively. And imaginary lines 26 indicate the position of the welding head upon completion of the process of pushing down the welding head. By thus controlling the stroke R of pushing down the welding head, the position P of the free end surface of the pole piece 5 with respect to the reference surface S of the mounting bracket 10 can be accurately determined. For this purpose, the recess 13 is provided with a welding portion 27 which melts away as the sensor main body 8 is pushed into the recess 13 with ultrasonic welding head applied to the sensor main body 8 so that a distance between the outer end surface P of the pole piece 5 and a reference surface S of the mounting bracket member may be determined by the stroke R of the ultrasonic welding head pushing the sensor main body 8 into the recess 13.

This ultrasonic welding is sufficient to seal off the recess 13, and prevent intrusion of moisture. To doubly ensure the sealing of the recess 13, the O-ring 23 is placed in the interface between the sensor main body 8 and the stay assembly 11.

Thus, the magnetic sensor of the present invention is easy and economical to fabricate, but highly durable and reliable in use.

Although the present invention has been described in terms of a specific embodiment thereof, it is possible to modify and alter details thereof without departing from the spirit of the present invention.

What we claim is:

1. A magnetic sensor, comprising:

a coil assembly including electroconductive wire wound around a bobbin;

a pole piece fitted into a central bore of said coil assembly;

a permanent magnet piece attached to an inner end of said pole piece;

a molded casing; said coil assembly, said pole piece, and said permanent magnet piece being integrally insert molded in said molded casing;

a mounting bracket assembly including a sensor mount member defining an open recess, an end of said molded casing being closely mounted in said recess, said mounting bracket assembly including a mounting bracket member integrally connected to said sensor mount member and having means for securely attaching said mounting bracket to an external member;

wherein at least one first terminal projects from said end of said molded casing mounted in said recess, and a second terminal is provided in said recess so that said first and second terminals are electrically coupled to each other when said molded casing end is mounted into said recess of said mounting bracket assembly; and wherein said mounting bracket member includes a reference surface and said pole piece includes an outer end surface, said molded casing being mounted in said recess to a set distance between the outer end surface and the reference surface.

2. A magnetic sensor according to claim 1 wherein an ultrasonic welded first part of said molded casing end in said recess is fixedly attached by ultrasonic welding to an inner wall surface of said recess of said mounting bracket assembly.

3. A magnetic sensor according to claim 2, wherein an O-ring extends between a second part of said molded casing and the interior wall surface of said recess.

4. A magnetic sensor according to claim 2, wherein said recess is provided with a welding portion which melts away to form a circumferential weld between said molded casing and said sensor mount member as said molded casing is mounted into said recess by an ultrasonic welding head applied to an exterior surface of the sensor such that a distance between the outer end surface of said pole piece and the reference surface of said mounting bracket member may be determined by a relative movement of the ultrasonic welding head and the reference surface pushing said molded casing end into said recess.

5. A magnetic sensor comprising:
   a molded resin casing having a coil assembly, a pole piece fitted into a central bore of the assembly and a permanent magnet attached to an inner end of the pole piece, integrally insert molded within said casing;
   a mounting bracket assembly including a sensor mount member defining an open recess, an end of said casing being closely mounted in said recess;
   said mounting bracket assembly further including a mounting bracket member integrally connected to said sensor mount member and having means for securely attaching said mounting bracket assembly to an external member; and
   wherein at least one first electrical terminal projects from said casing end mounted in said recess, and a second electrical terminal is provided in said recess so that said first and second electrical terminals are electrically coupled to each other when said casing end is mounted into said recess of said mounting bracket assembly.

6. A magnetic sensor according to claim 5 wherein said molded resin casing is a columnar shaped insert molded resin casing formed in a die assembly when insert molding said coil assembly, said pole piece and said magnet within said casing.

7. A magnetic sensor, comprising:
   a coil assembly including electroconductive wire wound around a bobbin;
   a pole piece fitted into a central bore of said coil assembly;
   a permanent magnet piece attached to an inner end of said pole piece;
   a molded casing; said coil assembly, said pole piece, and said permanent magnet piece being integrally insert molded in said molded casing;
   a mounting bracket assembly including a sensor mount member defining an open recess, an end of said molded casing being closely mounted in said recess, said mounting bracket assembly including a mounting bracket member integrally connected to said sensor mount member and having means for securely attaching said mounting bracket to an external member;
   wherein at least one first terminal projects from said end of said molded casing mounted in said recess, and a second terminal is provided in said recess so that said first and second terminals are electrically coupled to each other when said molded casing end is mounted into said recess of said mounting bracket assembly; and
   wherein said sensor mount member and said coil assembly are in a welded connection.

* * * * *